United States Patent [19]

Hill

[11] 3,982,495
[45] Sept. 28, 1976

[54] BICYCLE POWERED BOAT
[76] Inventor: Gerald L. Hill, 1047 W. Union St., Whitehall, Pa. 18052
[22] Filed: June 9, 1975
[21] Appl. No.: 584,757

[52] U.S. Cl. ............................................... 115/27
[51] Int. Cl.² ........................................ B63H 16/12
[58] Field of Search .................. 115/.5 A, 2, 25, 26, 115/27; 114/165; 280/289, 293

[56] References Cited
UNITED STATES PATENTS

| | | | |
|---|---|---|---|
| 535,623 | 3/1895 | Klein | 115/27 |
| 1,920,391 | 8/1933 | Herwig | 115/27 |
| 2,817,540 | 12/1957 | Pawsat | 280/293 |
| 3,352,272 | 11/1967 | Brazier | 114/165 |
| 3,406,885 | 10/1968 | Zurmuhlen | 280/289 X |
| 3,599,593 | 8/1971 | Fleming | 115/.5 A |

FOREIGN PATENTS OR APPLICATIONS 654,891  6/1963  Italy .................................. 115/.5 A Primary Examiner—Stephen G. Kunin
Assistant Examiner—Gregory W. O'Connor
Attorney, Agent, or Firm—Ronald B. Sherer

[57]  ABSTRACT

A boat is provided having an integrated, hydrodynamically shaped hull comprising forward and rear hull sections which are uniquely designed to be secured to and driven by a conventional bicycle; the forward and rear hull sections being separable from each other and being designed such that both hull portions may be readily mounted on and carried by a conventional rear bicycle carrier, or may be readily removed from the bicycle entirely.

10 Claims, 5 Drawing Figures

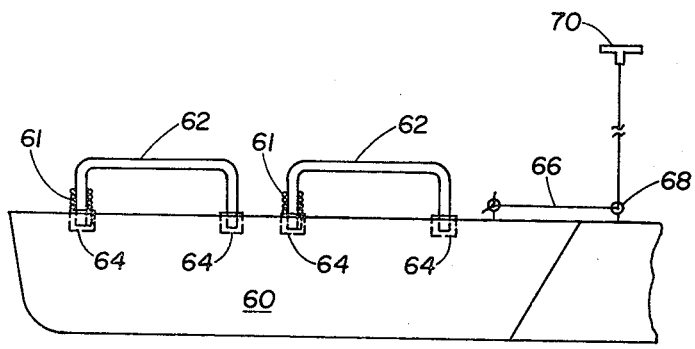
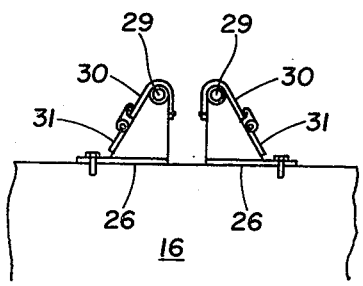
FIG. 3
FIG. 4
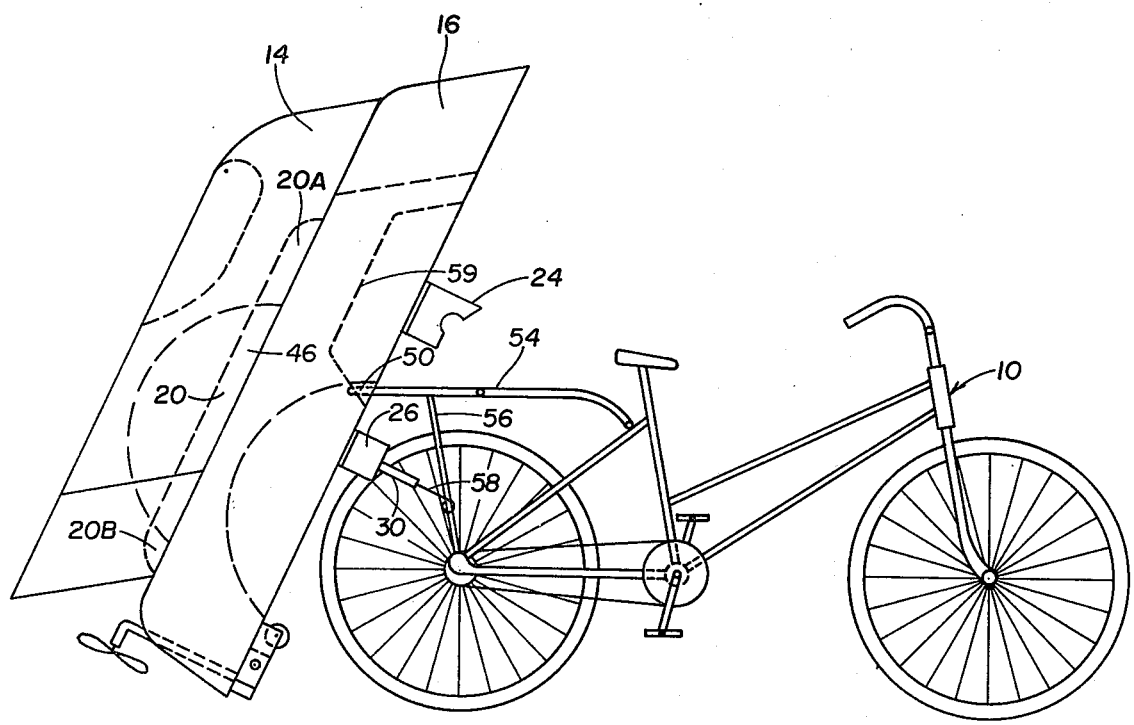
FIG. 5

3,982,495

BICYCLE POWERED BOAT

BACKGROUND OF THE INVENTION

Many watercraft have been previously proposed in which the means for propelling the craft comprise a foot pedal drive assembly. For example, so-called water bicycles have been disclosed in U.S. Pat. Nos. 858,093; 837,973 and 1,920,391 in which floats or pontoons are permanently connected to specially designed bicycle-type frames. However, this type of watercraft has the distinct disadvantage of only being usable in water since no wheels are provided for use on land. A second general type of watercraft has also been proposed in which bicycles having wheels are further provided with multiple pontoons which may be removed or retracted such as disclosed in U.S. Pat. Nos. 2,304,430 and 2,757,631. However, this type of watercraft has the disadvantage of being mechanically complex, awkward to carry on land, and/or difficult to connect and disconnect the bicycle and its drive chain from the propeller drive mechanism. A third type of watercraft has also been proposed such as disclosed in U.S. Pat. Nos. 587,074 and Dutch Pat. No. 13,687 in which a conventional bicycle is mounted on a one-piece boat hull. While this type of design has the advantage of being able to connect and disconnect the bicycle relatively easy for separate use of the bicycle on land, the large one-piece construction of the boat hull makes it very difficult to handle or carry on land, and it is impossible to carry it on the bicycle. In addition, the long one-piece hull construction with only a rear rudder for steering gives the boat a very large turning radius such that it cannot be turned around in a narrow stream or small pond.

SUMMARY OF THE INVENTION

The present invention provides an integrated, hydrodynamically shaped hull having a forward hull section which is readily connected to the front steering portion of a conventional bicycle and a rear hull section which is also readily connected to a conventional bicycle. When connected to a bicycle, the forward and rear hull sections are in sliding frictional engagement along an arcuate plane so as to form the integrated and streamlined hull the entire forward section of which turns relative to the rear hull section so as to provide a short turning radius and highly maneuverable boat which can be used on narrow streams and small ponds. In addition, the forward and rear hull sections are provided with attachment means which permit both hull sections to be easily disconnected from the bicycle, and the same attachment means also permit both hull sections to be readily mounted on and carried by a conventional rear bicycle carrier. In the preferred embodiment of the invention, the forward hull section is provided with a pivoted rudder for added maneuverability, and the rear hull section is provided with a retractable and extendible portion which, when extended outwardly, forms an outboard pontoon for added stability.

The foregoing and other objects and inventive features of the present invention will become more fully apparent from the following description of one preferred embodiment which is intended to be illustrative and not exhaustive of the invention.

BRIEF DESCRIPTION OF THE DRAWINGS

FIG. 3 is a side view taken along view line 3—3 of FIG. 2 showing additional details of the extendible and retractable hull portion forming the outboard pontoon;

FIG. 4 is an enlarged, fragmentary sectional view taken along view line 4—4 of FIG. 1 showing the details of the attachment mechanism, and FIG. 5 is a side elevational view showing a bicycle with the forward and rear hull sections mounted on a rear bicycle carrier.

DETAILED DESCRIPTION

Figure 1:
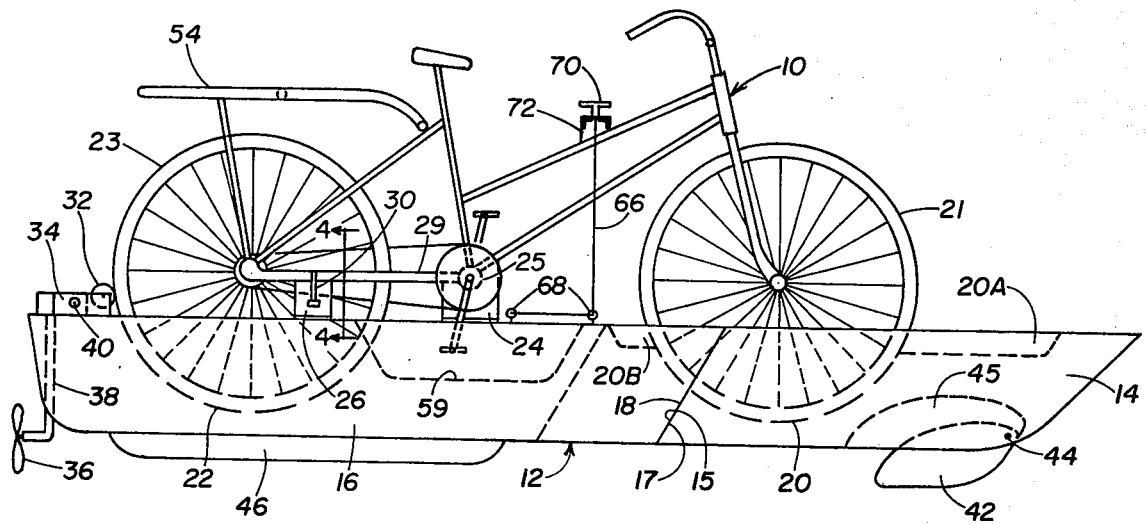
FIG. 1 is a side elevational view showing the forward and rear hull sections connected to a bicycle so as to form an integrated, hydrodynamically shaped hull.

Referring first to FIGS. 1 and 5, numeral 10 generally indicates a conventional bicycle having conventional parts including a frame, seat, handlebars, front and rear wheels, rear carrier and pedal drive assembly which parts will be further described insofar as they relate to the boat of the present invention.

Figure 2:
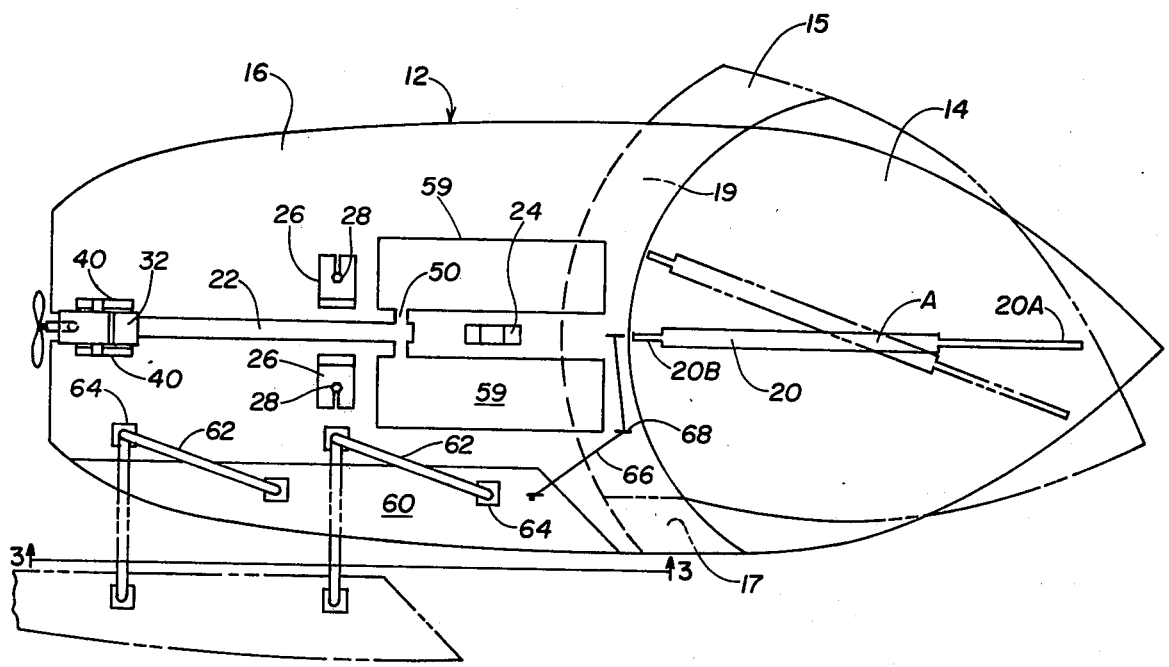
FIG. 2 is a top view of the integrated hull without the bicycle mounted thereon illustrating the turning movement of the front hull section and further showing details of the extendible hull portion in its retracted and extended positions.

Referring to FIGS. 1 and 2, the boat includes an integrated hull generally indicated by numeral 12 which is composed of a forward section 14 and a rear section 16. The front portion of forward section 14 may be shaped with a single pointed bow as illustrated, or may be shaped with multiple streamlined groove and bow portions such as the so-called tri-hull design known in the art. The rear portion of forward section 14 terminates in a rounded, convex surface 15 which is preferably inclined forwardly as shown by side edge 18 in FIG. 1. The forward portion of rear section 16 is formed with a mating concave surface 17 such that surfaces 15 and 17 are in sliding frictional engagement along the forwardly inclined, arcuate plane 19 defined by the interface of surfaces 15 and 17. Thus, the forward or bow section 14 is capable of pivoted turning movement about pivot point A relative to the rear or aft section 16 with surface 15 of the bow section in sliding frictional engagement with surface 17 of the aft section 16 while the two sections continue to form a single, integrated and streamlined hull having a very short turning radius.

Sections 14 and 16 may be composed of any suitable buoyant material such as wood, but are preferably composed of a fiberglass shell filled with a plastic foam such as polyurethane. While such fiberglass shells have a relatively low coefficient of friction such that the complete convex and concave surfaces 15 and 17 may be in frictional engagement, portions of these engaging surfaces may be coated with even lower friction materials, such as Teflon, so as to further reduce friction and promote the ease of turning forward section 14 relative to the rear section.

As previously indicated, the arcuate plane 19 of frictional engagement between surfaces 15 and 17 is preferably inclined forwardly such that the major portion of the weight of the driver sitting on the bicycle seat pushes the concave surface 17 of the rear section 16 downwardly against the convex surface 15 of forward section 14 the latter of which is urged upwardly by the buoyancy of forward section 14 which has much less weight of the driver pushing it downwardly.

As further shown in FIGS. 1 and 2, forward section 14 is provided with a slot 20 having a width sufficient to receive the front wheel 21 of the bicycle, while rear section 16 has a similar slot 22 of a width sufficient to receive the rear bicycle wheel 23. With respect to the forward section 14, it has been found that while additional attaching means may be used to secure the front wheel, such additional means are not necessary with the forwardly inclined plane of engagement described above, and that slot 20 may form the sole means for attaching the wheel to the forward section 14. As a result, the assembly and disassembly of the forward section merely requires inserting or removing the front wheel of the bicycle into or out of slot 20.

With respect to rear hull section 16, additional attachment means in addition to slot 22 have been found to be quite desirable, although not absolutely necessary. These additional attachment means preferably include a support block 24, which is bolted or otherwise secured to the deck of hull section 16, and which is shaped with a groove to receive the bearing housing 25 of the bicycle pedal assembly. Since this support block 24 is almost directly below the bicycle seat, the major weight of the driver is directly over the mid-portion of the length of the hull, and no clamp is necessary to maintain the pedal bearing housing 25 in the groove in the block. In addition, however, it has been found desirable to provide an additional support and attachment means for positively securing the bicycle to the rear hull section 16. These support and attachment means preferably are in the form of a pair of L-shaped brackets 26 which are adjustably secured to the deck of hull section 16 by a slot-and-bolt construction shown at 28. Thus, the width between brackets 26 may be adjusted so that the pair of conventional, horizontal frame members 29 of the bicycle rest upon the tops of brackets 26 as shown in FIGS. 1 and 4. A pair of flexible bands 30, such as straps or chains, are provided having one of their ends rigidly secured to the inside surface brackets 26, and these are pulled over the tops of frame members 29 and secured to the outside surfaces of brackets 26 by conventional overcenter latches 31 thereby strapping the frame members 29 to the brackets 26 and positively securing the bicycle to the hull section 16 in an easily removable manner.

When the bicycle wheels have been inserted in the wheel slots, and the bicycle secured to the hull by bands 30, the boat is ready for operation in the water. While various propeller drive mechanisms may be used, it has been found preferable to provide a friction wheel 32 which is frictionally engaged and driven by the rear bicycle wheel. Friction drive wheel 32 is preferably connected through a gear reduction unit 34 which drives one or more propellers 36 through suitable shafts and right angle gear assemblies (not shown) within a propeller casing 38. It has also been found desirable to pivotally mount the propeller assembly to the hull, as for example by pivoted brackets 40, such that the propeller assembly can swing upwardly and thereby facilitate pulling the rear hull section onto the land. It has also been found desirable to provide one or more pivoted front rudders 42 which are pivoted at 44 and capable of swinging upwardly into one or more slots 45. The provision of at least one such front rudder has been found to substantially increase the maneuverability of the boat and further decrease its turning radius and, by making this front rudder retractable, the bow section may be driven up onto land without interference by the front rudder.

Referring to FIGS. 1, 2 and 5, the boat of the present invention is particularly designed to be readily attached to and carried by the same conventional bicycle used to drive it in the water. This is achieved by providing a combination of several features including: a relatively shallow keel 46 of a length and depth such as to be received in slot 20 and narrower slot extensions 20A and B; by the particular design of brackets 26 and bands 30; and by the provision of a slot or cut-out portion 50 having a width sufficient to receive the tail portion of a bicycle rear carrier 54. Thus, as shown in FIG. 5, the rear hull section 16 is first mounted on the bicycle by engaging the tail portion of rear carrier 54 in slot 50, which bears the weight of the hull section, and bands 30 are secured to the carrier support bracket 56, or to a bicycle frame portion, such as by using an extension hook 58 if the strap itself is not long enough to reach a suitable frame portion. Alternatively, the carrier support bracket 56 may be modified with a curved shape so as to extend closer to bracket 26, or a longer auxiliary or adjustable band or strap may be provided in place of hook 58.

Once rear hull section 16 is attached in the above-indicated manner, forward hull section 14 is simply stacked on top such that keel 46 is received in slots 20, 20A and 20B which retain the hull section 14 in place. In this manner, all of the weight of the complete hull is carried by the rear bicycle carrier, and the front of the bicycle is free of any weight or interference with the turning ability of the bicycle.

While it has been found that a suitably dimensioned hull according to the above description has a very high degree of stability in the water, particularly because of the low center of gravity provided by the recessed location of the bicycle wheels in slots 20, 22 and the recessed pedal portions 59, it has been found desirable to provide auxiliary means for increasing lateral stability under certain conditions such as, for example, during mounting the bicycle in the water or while executing sharp turns. This is achieved by the provision of one or two extendible pontoons 60 which, when retracted, form an integral portion of the streamlined hull. As shown in FIGS. 2 and 3, extendible hull portions 60 may be connected to aft hull section 16 by a pair of connecting arms 62 the opposite ends of which are pivotally received in journals 64 provided in the aft hull section 16 and the extendible hull portions or pontoons 60. The pontoons are preferably spring-loaded so as to be urged toward their extended position and, while various spring arrangements are possible, simple coil springs 61 may surround the ends of arms 62 with one end of each spring connected to the arm and the other end secured to the hull or pontoon. Such extendible pontoons may be secured in their retracted position by various means such as latches; however, it is preferred to use a simple rope 66 connected to the pontoon and passing through eyelets 68 which terminates in a handle 70 which may be secured by a clip or bracket 72 to any convenient portion of the bicycle frame. Thus, releasing the handle from the bracket automatically extends the spring urged pontoon to its outboard position illustrated in phantom line in FIG. 2, and the pontoon may be readily retracted to its streamlined position as part of the hull merely by pulling handle 70 upwardly and securing it in bracket or clip 72 as shown in FIG. 1.

From the foregoing description of one preferred embodiment of the invention, it will be apparent that the present invention overcomes the substantial difficulties of the prior art designs of bicycle powered boats and successfully achieves all of the objects and advantages described in the foregoing specification. Of course, numerous modifications and mechanical various will be readily apparent from the foregoing description of one preferred embodiment, which is only illustrative of the principles of the invention, and that the legal scope of the invention is not to be limited other than as set forth in the following claims:

What is claimed is:

1. A bicycle powered boat comprising a single, hydrodynamically shaped hull, said hull having a forward section and a rear section, the rear portion of said forward hull section terminating in an arcuate surface and the forward portion of the rear hull section terminating in an arcuate surface, said arcuate surfaces being in frictional engagement with each other along an arcuate plane, means for securing said rear hull section to at least one portion of a bicycle, propeller and drive means connected to the aft portion of said rear hull section and positioned to be driven by engagement with the rear wheel of a bicycle, and means for securing said forward hull section to the front wheel portion of a bicycle for turning said front hull section relative to said rear hull section for steering said boat.

2. The bicycle powered boat as claimed in claim 1 in which said forward hull section includes a slot of sufficient width and depth to receive a substantial portion of a front bicycle wheel, and said rear hull section includes a slot of sufficient width and depth to receive a substantial portion of a rear bicycle wheel.

3. The bicycle powered boat as claimed in claim 2 in which said rear hull section includes a pair of recessed portions of sufficient width and depth to permit bicycle pedals to pass there through when the wheels of a bicycle are received in said slots.

4. The bicycle powered boat as claimed in claim 1 including a pair of support means positioned to engage and support a pair of bicycle frame members, and attachment means for positively securing the bicycle frame members to said support means.

5. The bicycle powered boat as claimed in claim 4 wherein said support means comprise a pair of brackets secured to said rear hull section, and said attachment means comprise flexible band means for strapping the bicycle frame members to said brackets.

6. The bicycle powered boat as claimed in claim 1 including a pivoted front rudder pivotally secured to the forward portion of the forward hull section.

7. The bicycle powered boat as claimed in claim 1 wherein said rear hull section includes a slot of a size sufficient to receive the tail portion of a bicycle rear carrier, and attachment means connected to said rear hull section for securing said rear hull section to a bicycle carrier support member.

8. The bicycle powered boat as claimed in claim 7 including a keel on the bottom of said rear hull section, and slots in said forward hull section of a width length to receive said keel for stacking and securing said forward hull section to said rear hull section.

9. The bicycle powered boat as claimed in claim 1 including an extendible and retractable pontoon shaped such as to form an integrated portion of said rear hull section when said pontoon is retracted into said rear hull section, and pivoted connecting means connecting said pontoon to said rear hull section.

10. The bicycle powered boat as claimed in claim 9 including spring means for urging said pontoon toward its extended, out-board position, and actuator means for retracting and securing said pontoon in its retracted position as an integrated portion of said rear hull section.

* * * * *